Dec. 13, 1932.   H. N. OTT   1,891,052
ADJUSTING MECHANISM FOR MICROSCOPE STAGES AND THE LIKE
Filed May 29, 1930   2 Sheets-Sheet 2
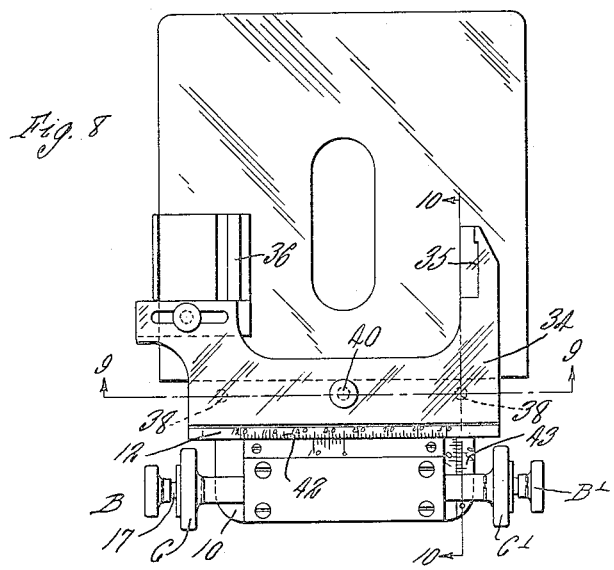
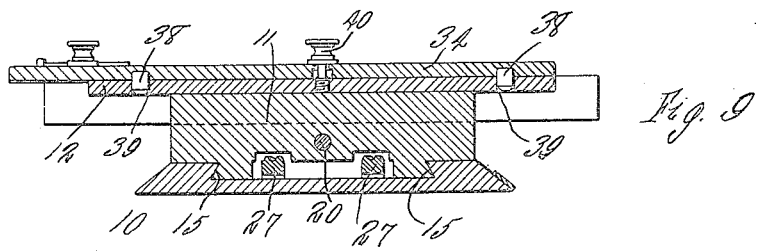
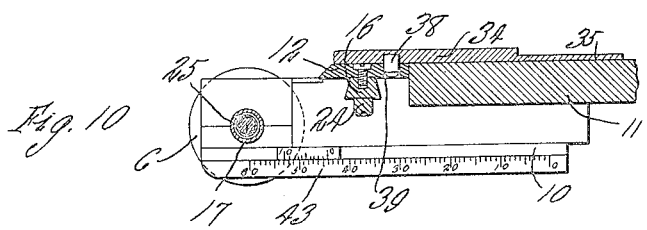
INVENTOR.
Harvey N. Ott
by Parker & Arehnow
ATTORNEYS.

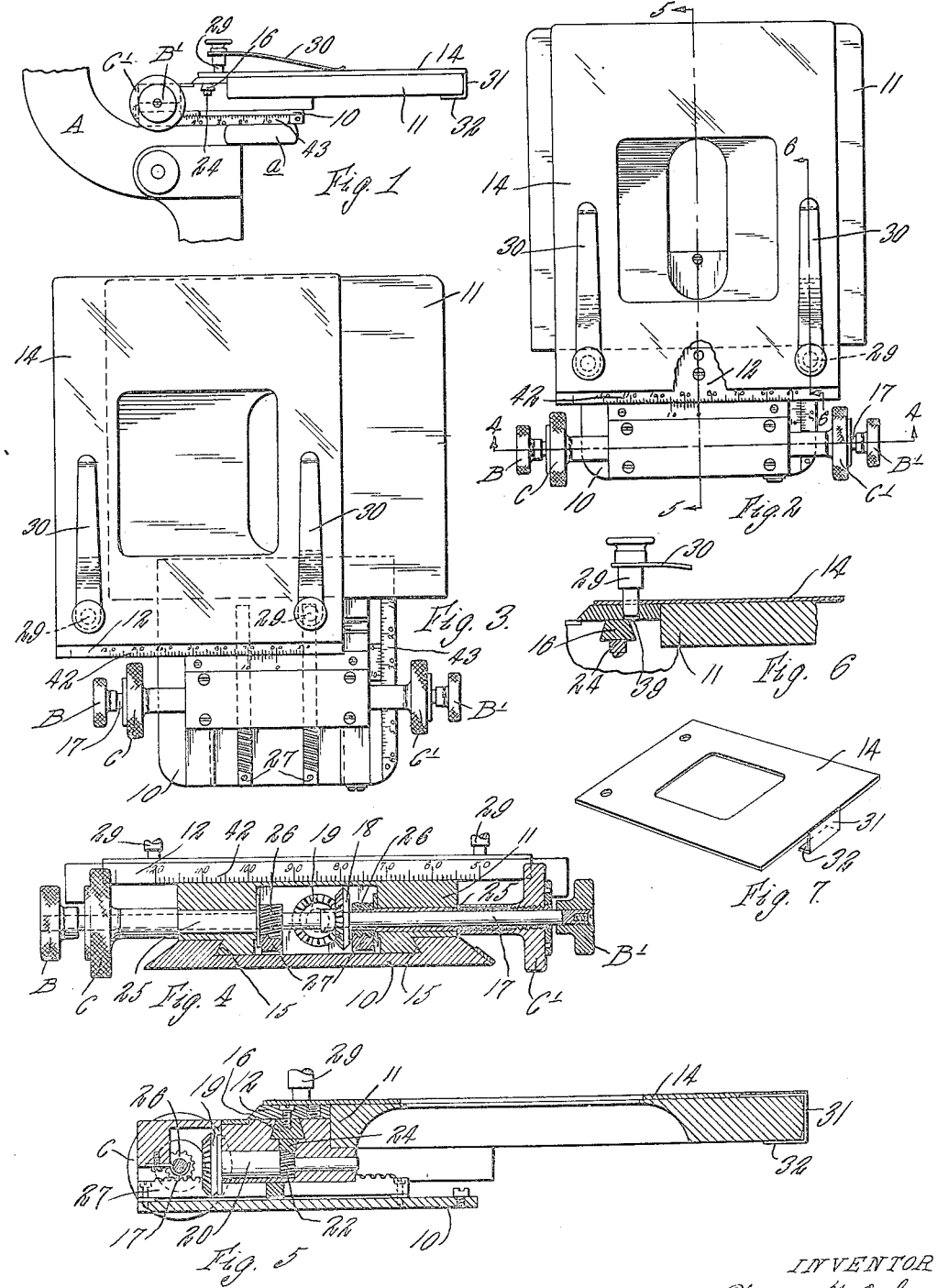

Patented Dec. 13, 1932

1,891,052

UNITED STATES PATENT OFFICE

HARVEY N. OTT, OF BUFFALO, NEW YORK, ASSIGNOR TO SPENCER LENS COMPANY, OF BUFFALO, NEW YORK

ADJUSTING MECHANISM FOR MICROSCOPE STAGES AND THE LIKE

Application filed May 29, 1930. Serial No. 456,833.

This invention relates to adjusting mechanisms of the kind which may be employed for accurately positioning a member, such, for example, as a microscope stage, in various positions in a single plane.

The objects of this invention are to provide mechanism of improved construction for effecting adjustment of a member, the adjusting means being actuated by two pairs of adjustable knobs, one pair being arranged at each side of the mechanism; also to provide a simple and efficient mechanism of this kind, in which all of the adjusting knobs are arranged on a single axis; also to improve adjusting mechanisms of this kind in other respects hereinafter specified.

In the accompanying drawings:

Fig. 1 is a side elevation of a portion of a microscope, having a stage provided with adjusting mechanism embodying this invention;

Fig. 2 is a top plan view of the stage and adjusting mechanism;

Fig. 3 is a top plan view thereof, showing the parts of the mechanism in different positions;

Fig. 4 is a transverse sectional elevation thereof, on an enlarged scale, on line 4—4, Fig. 2;

Fig. 5 is a longitudinal section thereof, on line 5—5, Fig. 2;

Fig. 6 is a fragmentary sectional elevation thereof, on line 6—6, Fig. 2;

Fig. 7 is a perspective view on a reduced scale of the stage or member to be adjusted;

Fig. 8 is a top plan view of a microscope having a slide holder of different construction mounted on the adjusting mechanism;

Fig. 9 is a sectional elevation thereof, on line 9—9, Fig. 8;

Fig. 10 is a sectional elevation thereof, on line 10—10, Fig. 8.

While my invention is primarily intended to be used in adjusting microscope stages, yet it will be obvious that this mechanism may be used equally well for effecting adjustment of any other member in various directions in a single plane, and it is not, therefore, intended to restrict this invention to use in connection with the adjustment of microscope stages.

Referring to Fig. 1, A represents a part of the arm or standard of a microscope on which the various parts of the microscope (not shown) are supported, the pedestal A including a horizontally extending portion or lug $a$ on which the stage or slide holder of the microscope is mounted.

The mounting for the stage includes a base member 10, which is rigidly secured upon the upper portion of the post $a$ of the microscope, or upon any other suitable support, an intermediate member 11 slidably mounted upon the base to move forward and backward in a straight line or path, and 12 represents an outer member slidable transversely of the direction of movement of the intermediate member 11, and adapted to support the stage 14 or slide holder of the microscope.

Any suitable or desired means may be employed for guiding the intermediate member in its movement with reference to the base, and in the construction shown, the intermediate member 10 is provided with inclined or beveled surfaces 15 which cooperate with corresponding undercut edges in the base. The outer member 12 may be provided with a depending dove-tailed part 16, as clearly shown in Figs. 5 and 6, which is slidably arranged in a groove of corresponding shape formed in the intermediate member 11. Any other means for guiding these members relatively to each other and to the base may be used, if desired.

It is very desirable in the case of a microscope to provide means at opposite sides of the base for effecting any desired adjustment of the stage, so that the stage can be adjusted by either hand of the user. In such cases, it is also desirable that all of the adjusting knobs be arranged on the same axis so that they can be easily located by the user of the microscope, without taking his eye from the microscope. In the construction illustrated, two pairs of adjusting knobs B, C, $B^1$ and $C^1$ are provided, and all of these knobs are arranged on the same axis. The knobs B and $B^1$, in the construction shown, are employed for effecting an adjustment of the outer member 12 with reference to the intermediate member 11, and the knobs C and C¹ are used for adjusting the intermediate member relatively to the base. Any suitable or desired mechanism may be employed for effecting these adjustments.

In the particular construction shown, the knobs B and B¹ are arranged on a single shaft 17 extending crosswise of and rotatably supported on a suitable part of the mechanism, for example, on the intermediate member 11, and the knobs B and B¹ are arranged at opposite ends of this shaft. At its intermediate portion, the shaft has a bevel gear 18 secured thereto, which meshes with another bevel gear 19 mounted on a shaft 20. The shaft 20 is suitably journaled in the intermediate member 11, and has a pinion 22 mounted thereon and meshing with a rack 24 secured to the outer member 12. In the particular construction shown, the rack is secured on the lower end of the dove-tailed guide member 16. Consequently, by turning either knob B or B¹, rotary motion is transmitted through the bevel gears to the pinion which meshes with the rack on the outer member, so that the outer member 12 may be moved crosswise of the intermediate member 11 in either direction.

The knobs C and C¹ are arranged on the outer ends of sleeves 25, which are arranged concentric with the shaft 17 and to turn about the same, and which have pinions 26 arranged on the inner ends of the sleeves. These pinions mesh with racks 27 suitably secured on the base 10. Consequently, by turning either knob C or C¹, the pinion 26 connected therewith through the sleeve 25 will propel the intermediate member relatively to the base and this movement of the intermediate member produces a corresponding movement of the other sleeve and the knob secured thereto.

The outer member 12 may be of any suitable or desired form, and in the construction shown, consists of a comparatively narrow plate slidable at the front edge of the intermediate member 11. One end of the microscope stage 14 may be secured thereto by means of pins 29 extending through holes in the stage 14 registering with holes 39 in the outer member 12, and these pins 29 may also carry the usual springs 30 for holding the slides or other objects in place on the microscope stage. The other end of the microscope stage is provided with a downwardly projecting part 31 extending beyond the adjacent edge of the intermediate member 11 and terminating in an inwardly extending flange 32 engaging the lower face of the intermediate member, so that this edge of the stage is guided and kept in operative position by the intermediate member 11. Other means for supporting a slide or object holder on the outer member 12 may, however, be provided, if desired.

The construction of the adjusting mechanism described readily lends itself to the use of different types of slide holders, stages or other object supports in connection with the outer member 12 of the adjusting mechanism, which is slidable crosswise of an edge of the intermediate member 11. In Figs. 8 to 10 inclusive, a modified form of a slide holder is illustrated at 34, which has a pair of forwardly extending arms 35 and 36 formed to receive the edge of a slide. The body portion of this holder is provided with a pair of pins 38 adapted to enter into the holes or recesses 39 of the outer member, with which the pins 29 cooperate. If additional means for securing the holder 34 on the outer member 12 are desired, a clamping screw 40 may be provided, which may engage in a threaded hole in the outer member 12 of the adjusting mechanism. This renders the stage of the microscope easily interchangeable for any other stage, and this construction also makes it possible to use the scales 42 and 43 arranged on the outer member and the base with any type of stage which may be used in connection with the adjusting mechanism.

I claim as my invention:

1. The combination of a base, an intermediate member guided to move in a straight path relatively to said base, an outer member mounted on said intermediate member to move relatively thereto transversely of the path of movement of said intermediate member relatively to said base, two pairs of coaxial adjusting knobs, a pair of knobs being arranged at each side of said intermediate member, means connecting one knob of each pair with said base for moving said intermediate member relatively to said base, and means connecting the other knob of each pair with said outer member for actuating the same.

2. The combination of a base, an intermediate member guided to move in a straight path relatively to said base, an outer member mounted on said intermediate member to move relatively thereto transversely of the path of movement of said intermediate member relatively to said base, two pairs of coaxial adjusting knobs, a pair of knobs being arranged at each side of said intermediate member, a shaft on which one knob of each pair is mounted, means connected with said shaft for moving one of said members, and rack and pinion means connecting the other knob of each pair for moving the other member.

3. The combination of a base, an intermediate member guided to move in a straight path relatively to said base, an outer member mounted on said intermediate member to move relatively thereto transversely of the path of movement of said intermediate member relatively to said base, two pairs of co-axial adjusting knobs mounted on shafts for actuating both members, a pair of knobs being arranged at each side of said intermediate member, a shaft on which one knob of each pair is mounted, means connected with said shaft for moving one of said members, sleeves arranged about said shaft, each sleeve being secured to one of the other knobs, and driving connections between said sleeves and the other member to cause turning of either sleeve to adjust said other member and to produce corresponding turning of the other sleeve.

4. The combination of a base, an intermediate member guided to move in a straight path relatively to said base, an outer member mounted on said intermediate member to move relatively thereto transversely of said path, two pairs of adjusting knobs to turn about a common axis, one pair being arranged at each side of said intermediate member, a shaft rotatably mounted having one knob of each pair secured thereto, a pair of sleeves arranged to turn concentrically with reference to said shaft, one of the other knobs of each pair being secured to one of said sleeves, mechanism connected with the said shaft for moving said other member in one direction with reference to said base, pinions on said sleeves and racks on said outer member meshing with said pinions for moving said outer member in the other direction with reference to said base.

5. The combination of a base, an intermediate member guided to move in a straight path relatively to said base, an outer member mounted on said intermediate member to move relatively thereto transversely of said path, two pairs of adjusting knobs so mounted as to turn about a common axis, extending transversely to said straight path, one pair being arranged at each side of said intermediate member, a shaft rotatably mounted having one knob of each pair secured thereto, a second shaft rotatably mounted and extending substantially at right angles to said first shaft and driven from said first shaft, a driving connection between said second shaft and said outer member for moving said outer member relatively to said intermediate member, and means connected with said other knobs for moving said intermediate member relatively to said base.

6. The combination of a base, an intermediate member guided to move in a straight path relatively to said base, an outer member mounted on said intermediate member to move relatively thereto transversely of said path of movement, a pair of adjusting knobs at each side of said intermediate member, a shaft on which one knob of each pair is secured, means connected with said shaft for moving said outer member relatively to said base in a direction parallel to said shaft, and means connected with said other knobs for moving said outer member in the other direction relatively to said base.

7. The combination of a base, an intermediate member guided to move in a straight path relatively to said base, an outer member mounted on said intermediate member to move relatively thereto transversely of said path, two pairs of adjusting knobs mounted on said intermediate member to turn about a common axis, one pair being arranged on each side of said intermediate member, a rack mounted on said base, a pinion journaled on said intermediate member and meshing with said rack for adjusting said intermediate member relatively to said base, a second rack mounted on said outer member, a second pinion meshing with said second rack for adjusting said outer member relatively to said intermediate member, connections between one knob of each pair and one of said pinions, and connections between the other knob of each pair and said other pinion.

8. The combination of a base, an intermediate member guided to move in a straight path relatively to said base, an outer member mounted on said intermediate member to move relatively thereto transversely of said path, two pairs of adjusting knobs mounted to turn about a common axis, one pair being arranged at each side of said intermediate member, a shaft rotatably mounted having one knob of each pair secured thereto, means driven by said shaft for adjusting said outer member relatively to said intermediate member, a pair of sleeves mounted to rotate concentrically with said shaft, each sleeve having one of the other knobs secured thereto, a pair of racks, and a pinion on each sleeve, each pinion meshing with one of said racks for adjusting said intermediate member relatively to said base.

9. The combination of a base, an intermediate member guided to move in a straight path relatively to said base, an outer member mounted on said intermediate member to move relatively thereto transversely of said path, two pairs of adjusting knobs mounted to turn about a common axis, one pair being arranged at each side of said intermediate member, a shaft rotatably mounted having one knob of each pair secured thereto, a pair of sleeves mounted to rotate concentrically with said shaft, each sleeve having one of the other knobs secured thereto, a pair of racks, a pinion on each sleeve, each pinion meshing with one of said racks for adjusting said intermediate member relatively to said base, and means connected with said shaft between said two pinions for adjusting said outer member relatively to said intermediate member.

10. The combination of a base, an intermediate member guided to move in a straight path relatively to said base, an outer member mounted on said intermediate member to move relatively thereto transversely of said path, two pairs of adjusting knobs mounted on said intermediate member to turn about a common axis, one pair being arranged at each side of said intermediate member, a shaft rotatably mounted having one knob of each pair secured thereto, a pair of sleeves mounted to rotate concentrically with said shaft, each sleeve having one of the other knobs secured thereto, a pair of racks, a pinion on each sleeve, each pinion meshing with one of said racks for adjusting said intermediate member relatively to said base, a second shaft extending substantially at right angles to said first mentioned shaft, driving connections between said two shafts arranged between said pinions, and means operated by said second shaft for moving said outer member relatively to said intermediate member.

11. The combination of a base, an intermediate member having a plane top face guided to move in a straight path relatively to said base and extending into a position below an object to be examined, an outer member mounted on said intermediate member at one edge thereof below said top plane of the latter to move relatively thereto transversely of said straight path, and an object supporting member secured to said outer member and extending therefrom over and upon said intermediate member and movable with said outer member relatively to said intermediate member.

12. The combination of a base, an intermediate member guided to move in a straight path upon and relatively to said base, an outer member mounted on said intermediate member at one edge thereof to move relatively thereto transversely of said straight path, an object supporting member extending across said intermediate member, and interfitting, quick detachable connections for releasably securing said object supporting member on said outer member and including parts for releasably securing an object in place upon said object supporting member.

HARVEY N. OTT.